United States Patent [19]

Van Sickle et al.

[11] Patent Number: 4,615,652
[45] Date of Patent: Oct. 7, 1986

[54] CUTTING TOOL COMPENSATOR FOR ROTARY MACHINE TOOL

[75] Inventors: Richard G. Van Sickle, Sterling Heights; Gerald W. Mathie, Holly, both of Mich.

[73] Assignee: GTE Valeron Corporation, Troy, Mich.

[21] Appl. No.: 687,671

[22] Filed: Dec. 31, 1984

[51] Int. Cl.⁴ .................................................. B23B 29/034
[52] U.S. Cl. ........................................ 408/168; 408/161
[58] Field of Search ............... 408/161, 168, 180, 3, 408/154, 155, 156, 714; 409/233; 82/1.2, 2 E, 1.4, DIG. 9

[56] References Cited

U.S. PATENT DOCUMENTS

| | | | |
|---|---|---|---|
| 2,093,742 | 9/1937 | Staples | 408/156 |
| 3,486,412 | 12/1969 | Schraub et al. | 409/233 |
| 3,740,161 | 6/1973 | Milewski | 408/168 |
| 3,893,371 | 7/1975 | Frazier | 409/233 |
| 4,009,968 | 3/1977 | Vandenkieboom | 408/12 |
| 4,223,260 | 9/1980 | Beer et al. | 318/696 |
| 4,268,783 | 5/1981 | Murray | 318/632 |
| 4,416,569 | 11/1983 | Yamakage | 408/168 |

FOREIGN PATENT DOCUMENTS

| | | | |
|---|---|---|---|
| 759981 | 2/1934 | France | 408/161 |
| 500416 | 11/1954 | Italy | 408/161 |
| 2040742 | 9/1980 | United Kingdom | 409/233 |
| 2122119 | 1/1984 | United Kingdom | 82/1.2 |
| 759243 | 8/1980 | U.S.S.R. | 408/180 |

*Primary Examiner*—John McQuade
*Attorney, Agent, or Firm*—Witherspoon & Hargest

[57] ABSTRACT

A machine tool of the type having a rotatably mounted housing circumscribing a longitudinal axis of rotation and adapted for having coupled thereto a tool holder having at least one cutting tool which is adjustable radially of the axis such that a cutting edge of the cutting tool is caused to engage and disengage a workpiece as a result of a camming action between the cutting tool and a drawbar resulting from reciprocation of the drawbar as the roller screw to which it is attached rotates.

15 Claims, 3 Drawing Figures

CUTTING TOOL COMPENSATOR FOR ROTARY MACHINE TOOL

BACKGROUND OF THE INVENTION

1. Field of the Invention

The present invention is related to a machine tool of the type having a rotatably mounted spindle shaft having a longitudinal axis of rotation and adapted for having coupled thereto a tool holder having a plurality of cutting inserts which are adjustable radially of the axis before, during, or after the cutting operation depending on the work being done.

2. Description of the Prior Art

Presently, parts can be machined to very close tolerances and at high speeds often without the need for secondary operations such as honing, grinding and lapping.

Great improvements have been made in machine tools, particularly those tools which provide automatic adjustment for cutting tool inserts radially inward or outward, as and when desired, to, for example, compensate for wear of the cutting edge, for boring, turning, grooving, finishing on a retract stroke, to withdraw the tool from a workpiece without marking the side wall of a finished bore, or for bore sizing and contour boring. One cutting machine which has provided significant advances in achieving these results is described in U.S. Pat. No. 3,740,161 and is made by GTE Valeron Corporation. With this tool, the cutting edges of all of the inserts can be automatically adjusted outwardly and inwardly precisely and quickly without human intervention and possible error, and downtime. However, the hydraulic mechanism used has caused alignment concerns which have limited the use of such equipment to its fullest advantage. Alignment concerns have been particularly difficult at high speeds.

Another problem results from the fact that often state of the art cutting machines do not include hydraulic systems. With such machinery it is necessary to modify the basic cutting machine by supplementing it with an auxiliary hydraulic system. In addition to the fact that such an addition must be provided for, problems associated with the use of hydraulic apparatus are incurred. For example, hydraulic systems include various hydraulic pumps which tend to be noisy and also require attention in order to be maintained in acceptable operating conition. In addition, other hardware associated with a hydraulic system is required which adds to the cost and upkeep of such apparatus. In addition, it is not uncommon for hydraulic systems to operate continuously throughout the day even though the particular machine with which the system is associated may not be in use. Such continuous use obviously involves an unnecessary use of energy. In addition, various components of a hydraulic cutting machine may have a reduced life due to repetitive operation caused by continual stroking of the hydraulic mechanism.

The addition of a hydraulic system also will require the addition of a control system to control the hydraulic equipment. Thus two systems will be required; one to control the cutting tool per se and one to control the hydraulic apparatus.

A further concern is that the actual control of the orientation or location of the cutting tool tends to be rather complicated when a hydraulic system is being used.

A related problem is that the known prior art machine tools are not as compact as desired in the sense that the entire mechanism which causes radial movement of the inserts is not mounted directly to the spindle shaft of the tool, and this tends to aggravate the alignment concern.

It is highly desirable to provide a machine tool which can be operated without concern about tool alignment considerations. It is also desirable to solve this problem and at the same time eliminate the need for an auxiliary system, particularly an auxiliary hydraulic system with all of the problems noted herein associated with such a system. It is also desirable to provide a machine tool wherein what is referred to in the art as a closed loop system may be utilized. In such a system, means are provided for orienting or locating the cutting tool in such a manner that simultaneously with such tool orientation signals are sent back to the orientation means to identify the cutting tool location and thereby facilitate proper positioning of the tool.

SUMMARY OF THE INVENTION

This invention achieves these and other results by providing a machine tool of the type having a rotatably mounted housing circumscribing a longitudinal axis of rotation and adapted for having coupled thereto a tool holder having at least one cutting tool which is adjustable radially of the axis. The machine tool includes a drawbar which extends along the axis and is reciprocatably mounted within the housing and adapted for coupling to the cutting tool for causing the radial movement of the cutting tool in response to reciprocation of the drawbar. Means are coupled to the housing for rotating the housing.

A roller screw is mounted within the housing. The roller screw includes a leadscrew spindle extending along the housing axis and at least one nut body operatively coupled thereto. The roller screw is mounted so that rotary motion of the leadscrew spindle about the axis causes movement of the nut body along the axis. Means are coupled to the leadscrew spindle for controlled rotation thereof.

Means are provided within the housing and coupled to the drawbar and to the nut body for reciprocating the drawbar along the axis in response to movement of the nut body along the axis.

Means are provided coupling the housing and the drawbar for rotating the drawbar about the axis when the housing rotates about the axis.

BRIEF DESCRIPTION OF THE DRAWINGS

The objects, features and advantages of the present invention will be clearly understood to those skilled in the art by reference to this disclosure and the attached drawings in which.

DESCRIPTION OF THE PREFERRED EMBODIMENTS

Figure 1:
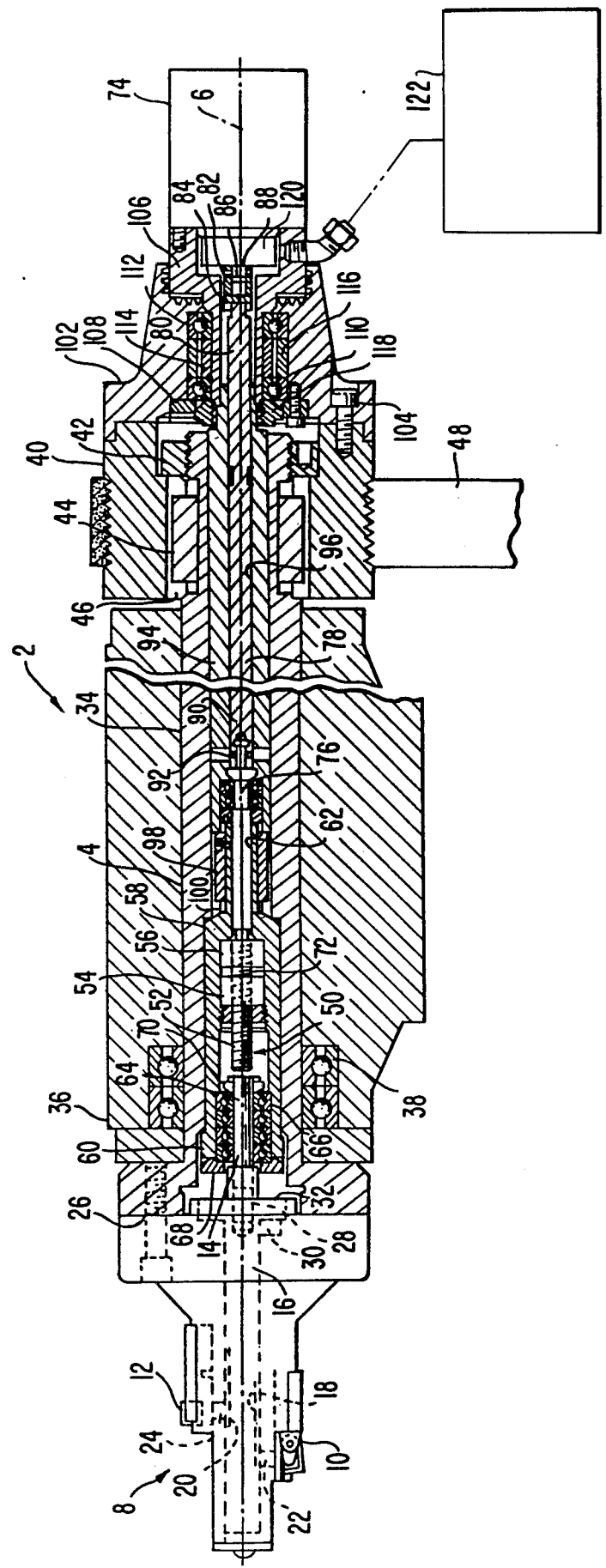
FIG. 1 is a cross sectional view of one embodiment of the present invention.

The embodiment of this invention which is illustrated in FIG. 1 is particularly suited for achieving the objects of this invention. FIG. 1 depicts a machine tool 2 of the type having a rotatably mounted housing 4 circumscribing a longitudinal axis of rotation 6 and adapted for having coupled thereto in a known manner a tool holder 8. Tool holder 8 includes at least one cutting tool which is adjustable radially of the axis 6. Cutting tools are depicted in FIG. 1 in the form of tool inserts 10 and 12 each of which has a cutting edge which is caused to engage and disengage a workpiece in a known manner to cut the workpiece during rotation of the housing 4 about axis 6.

A drawbar 14 extends along axis 6 and is reciprocatably mounted within housing 4 and adapted for coupling in a known manner to the tool holder 8 for causing the radial movement of the cutting tool in response to reciprocation of the drawbar. For example, in the apparatus of FIG. 1, drawbar 14 is coupled to the drawbar extension 16 of tool holder 8. Reciprocation of drawbar 14 causes corresponding reciprocation of drawbar extension 16 causing the cutting inserts 10 and 12 to pivot in a radial direction relative to axis 6 as a result of a camming action between camming surfaces 18 and 20 of drawbar extension 16 and cam followers 22 and 24 of cutting inserts 10 and 12, respectively.

Means are provided for coupling housing 4 and drawbar 14 for rotating the drawbar about axis 6 when housing 4 rotates about axis 6, without preventing the reciprocation of the drawbar within the housing. For example, tool holder 8 is bolted to housing 4 at interface 26. Drawbar extension 16 is threaded to drawbar 14 at interface 28 and is keyed to the tool holder for rotation therewith by means of a keyway 32 which slides relative to key member 30 fixed to tool holder 8.

The housing 4 of machine tool 2 is depicted in FIG. 1 as including a spindle shaft 34 which is rotatably mounted in a known manner within a spindle body 36. Rotation of the spindle shaft 34 relative to spindle body 36 and about axis 6 is facilitated by a plurality of ball bearings 38. Although bearings 38 are only depicted at the left hand end of the spindle shaft 34 as viewed in FIG. 1, it will be understood that other ball bearings 38, not shown, will also be positioned at least at the right hand end of the spindle shaft 34.

The spindle shaft 34 has attached to one end thereof means for rotating the shaft discussed in more detail hereinafter.

Means are coupled to housing 4 for rotating the housing about axis 6. For example, spindle shaft 34 can have means such as a pulley 40 attached to one end thereof by a pulley locknut 42. In addition, a pulley key 44 extends into a keyway 46 to facilitate rotation of the spindle shaft 34. In operation, the spindle shaft is caused to rotate by pulley 40 and drive belt 48 in a known manner.

A roller screw 50 is also mounted within the housing 4. Roller screw 50 includes a leadscrew spindle 52 extending along axis 6. Also provided is at least one nut body operatively coupled to the leadscrew spindle. In FIG. 1, nut bodies 54 and 56 are operatively coupled to the leadscrew spindle 52. The roller screw 50 is mounted within housing 4 such that rotary motion of the leadscrew spindle 52 about axis 6 causes movement of the nut bodies 54 and 56 along axis 6.

Means within the housing 4 is coupled to the drawbar 14 and nut bodies 54 and 56 for reciprocating the drawbar along axis 6 in response to movement of the nut bodies 54 and 56 along axis 6. For example, FIG. 1 depicts a slide member 58 extending along axis 6 and having a first open end 60 and an axially spaced second open end 62. One end 64 of drawbar 14 extends into the first open end 60 and includes means coupled thereto for preventing axial movement of the drawbar relative to the slide member but permiting the drawbar to rotate relative to the slide member. For example, drawbar 14 is mounted for rotation within slide member 58 by means of ball bearings 66 which are held in place by a clamping ring 68 bolted (not shown) to the slide member and by a bearing locknut 70, as well as by opposing shoulders of the slide member and the drawbar.

A portion 72 of the leadscrew spindle 52 extends into the second open end 62 of the slide member 58. A spacer serves to separate and preload the nut bodies, In particular, and as depicted in FIG. 1 of the drawings, nut bodies 54 and 56 are separated by a spacer and operatively coupled to portion 72 of the leadscrew spindle, as for example, by inner and outer threads of the nut bodies and leadscrew spindle, respectively. Nut bodies 54 and 56 are held in place by a locknut, attachment of the slide member 58 being further facilitated by screws (not shown). In this manner, movement of the nut bodies relative to the slide member is prevented.

Means are coupled to leadscrew spindle 52 for rotating the leadscrew spindle about axis 6. For example, FIG. 1 depicts a motor 74. Means are provided for coupling a portion 76 of the leadscrew spindle extending out of the second open end 62 of the slide member 58 to the motor 74. For example, a drive shaft 78 extends within the spindle shaft 34. One end 80 of the drive shaft 78 is coupled to the motor 74 by means of a coupling 82 having pins 84 and 86 extending therethrough and through the shaft 78 and motor shaft 88, respectively, in a known manner as shown in the drawing. The other end 90 of the drive shaft 78 is coupled to the leadscrew spindle 52 by means of a pin 92 extending through the leadscrew spindle, one end of which extends into a recess or bore in shaft 78, and through the shaft 78, in a known manner as shown in the drawing.

In order to facilitate rotation of the drive shaft 78, a stationary sleeve 94 is positioned within the spindle shaft 34. Drive shaft 78 extends through the sleeve opening or bore 96 which extends from one sleeve end to an opposing sleeve end. In order to prevent rotation of the slide member 58 within the spindle shaft 34, slide member 58 is keyed to the stationary sleeve 94 by means of a key 98 which slides in a keyway 100 of sleeve 94. Portion 76 of leadscrew spindle 52 is mounted for rotation relative to the sleeve 94 by ball bearings depicted as being held in place between a first locknot and shoulder of sleeve 94 and a second locknut and shoulder of spindle 52.

FIG. 1 depicts a motor mount housing 102 coupled to pulley 40 by means of four bolts 104. A stationary motor mount 106 is coupled to the housing 102. In particular, a clamp ring 108 engages one shoulder of housing 102 and positions the rotating portion of bearings 110 and 112, separated by spacer 116, against another shoulder of housing 102. In a like manner the stationary portion of bearings 110 and 112 are spaced by spacer 114 and urged against a shoulder of the motor mount 106 by a locknut 118 depicted threaded to the left end of the motor mount. Motor 74 is bolted to the stationary motor mount 106 as depicted in the drawing.

Figure 2:
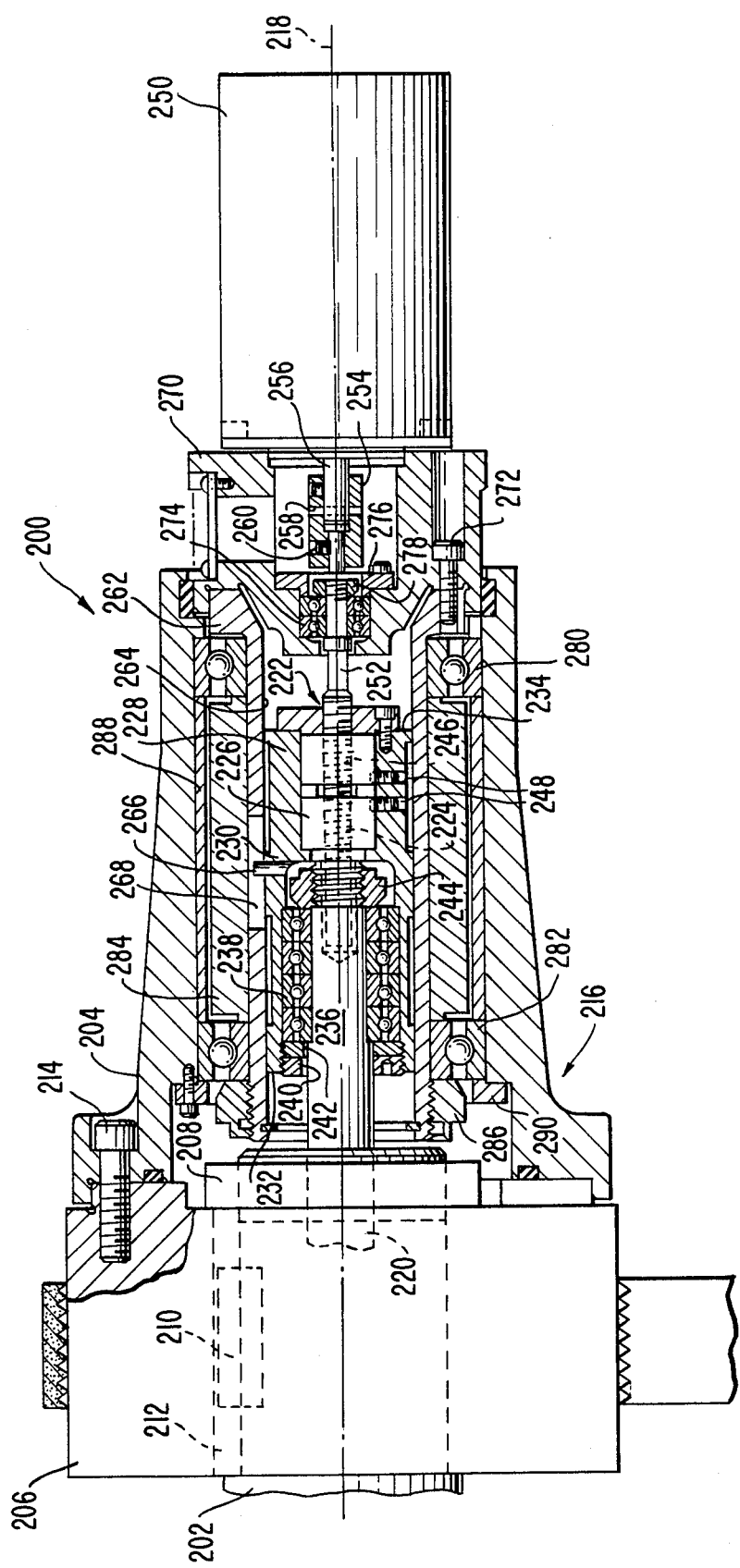
FIG. 2 is a cross sectional view of another embodiment of the present invention.

In the alternative embodiment of FIG. 2 the roller screw apparatus is positioned external of the spindle shaft. In this embodiment, the machine tool 200 includes a rotatably mounted housing including the spindle shaft 202 and the body portion 204 both of which are coupled to the pulley 206. For example, spindle shaft 202 is coupled to pulley 206 by a pulley locknut 208 and is keyed to the pulley to facilitate mutual rotation of the pulley and the spindle shaft by key 210 and keyway 212. On the other hand, body portion 204 is attached to pulley 206 by means of bolts 214, only one of which is shown. The rotatably mounted housing includes the spindle shaft 202 and body portion 204 and is generally identified by reference numeral 216. Housing 216 is caused to rotate about axis 218 by pulley 206 and a drive belt in a known manner.

A drawbar 220 extends along axis 218 and is reciprocatably mounted within the housing 216. Although not shown in FIG. 2, drawbar 220 extends to the left beyond FIG. 2, through spindle shaft 202 which is mounted in a known manner within a spindle body (not shown) similar to spindle body 36 of FIG. 1, for coupling to a tool holder such as tool holder 8 of FIG. 1 for causing the radial movement of the cutting tool 10 and 12 in response to reciprocation of the drawbar as described herein.

A roller screw 222 is mounted within body portion 204 of housing 216. Roller screw 222 includes a leadscrew spindle 224 extending along axis 218. Also provided are nut bodies 226 and 228 which are operatively coupled to the leadscrew spindle 224. The roller screw 222 is mounted within body portion 204 such that rotary motion of the leadscrew spindle about axis 218 causes movement of the nut bodies 226 and 228 along axis 218.

A slide member 230 extends along axis 218 and includes a first open end 232 and an axially spaced second open end 234. One end 236 of the drawbar 220 extends into the open end 232 and includes means coupled thereto for preventing axial movement of the drawbar relative to the slide member but permitting the drawbar to rotate relative to the slide member. For example, drawbar 220 is mounted for rotation within slide member 230 by means of ball bearings 238 which are held in place by locknuts 240 and 242 and an opposing shoulder of the slide member, and by a bearing locknut 244 and an opposing shoulder of the drawbar. Slide member 230 provides means for reciprocating the drawbar 220 along axis 218 in response to movement of the nut bodies 226 and 228 along axis 218.

A portion 246 of the leadscrew spindle 224 extends into the second open end 234 of the slide member 230. A spacer serves to separate and preload the nut bodies. As depicted in FIG. 2 of the drawings, nut bodies 226 and 228 are separated by a spacer and operatively coupled to portion 246 of the leadscrew spindle, as for example, by inner and outer threads of the nut bodies and leadscrew spindle, respectively. Nut bodies 226 and 228 are held in place by a clamp ring and screws, attachment to the slide member 230 being further facilitated by screws 248. In this manner, movement of the nut bodies relative to the slide member is prevented. Portion 246 extends into a bore in an adjacent end of drawbar 220. Clearance is provided between the leadscrew spindle and the bore surface so that the drawbar does not rotate with the spindle, and is free to reciprocate relative to the spindle, during spindle rotation.

Means are coupled to the leadscrew spindle for rotation thereof about axis 218. For example, FIG. 2 depicts a motor 250. Means are provided for coupling a portion 252 of the leadscrew spindle extending out of the second open end 234 of the slide member 230 to the motor 250. As shown in FIG. 2, a coupling 254 is attached to motor shaft 256 by pin 258 and to portion 252 of the leadscrew spindle by set screw 260.

In order to facilitate reciprocation of slide member 230 along axis 218 a stationary sleeve 262 is provided. Slide member 230 slides in the bore 264 of sleeve 262 and is guided by means of a roll pin 266 extending from the slide member 230 to a guideway 268 in the sleeve 262.

FIG. 2 depicts a stationary motor mount 270 coupled to the sleeve 262 by bolts 272 only one of which is shown. Rotation of the leadscrew spindle relative to the motor mount 270 is facilitated by ball bearings 274 held in place by flanged portions of the motor mount and leadscrew spindle and by ring 276 and locknut 278.

Rotation of the body portion 204 of the rotatably mounted housing 216 relative to the stationary motor mount 270 is facilitated by the stationary portion of bearings 280 and 282 spaced by a spacer 284 and held in place by a flanged end of the sleeve 262 and locknut 286, and also spaced by a spacer 288 and held in place by a flanged end of the body portion 204 and a clamped ring 290 with bolts. Possible rotation of the motor 250 and a motor mount 270 caused by bearing friction can be prevented by bracketing the motor and mount in place.

The embodiments of FIG. 1 and 2 operate essentially in the same manner. For example, and referring to FIG. 1, the drive shaft 78 is caused to rotate by motor 74. Rotation of the drive shaft causes the leadscrew spindle 52 to rotate. Such rotation of the leadscrew spindle causes the nut bodies 54 and 56 which are threaded upon spindle 52 to move relative thereto in an axial direction along axis 6. Since the nut bodies 54 and 56 are coupled to the slide member 58, movement of the nut bodies causes corresponding movement of the slide member along axis 6. Since the slide member 58 is coupled to the drawbar 14 such movement of the slide member causes corresponding movement of the drawbar along the axis 6 thereby causing the cutting inserts 10 and 12 to pivot in a radial direction relative to axis 6 as a result of a camming action between camming surfaces 18 and 20 of drawbar extension 16, to which drawbar 14 is coupled, and cam followers 22 and 24 of cutting inserts 10 and 12, respectively. By controlling the speed and rotational direction of motor shaft 88, cutting tools 10 and 12 can be caused to pivot towards and away from a workpiece as quickly as and to the extent desired.

The actual cutting operation results from rotation of the spindle shaft 34 and the tool holder 8 attached thereto to which the cutting tools 10 and 12 are coupled. Rotation of the spindle shaft is caused by the rotation of pulley 40 by drive belt 48 in a known manner.

The embodiment of FIG. 2 operates in essentially the same manner with the exception that the motor shaft 256 is coupled directly to the leadscrew spindle 224.

Regarding FIGS. 1 and 2, the various ball bearings referred to herein and depicted in the drawings include bearings known in the art to comprise an inner and outer race having a ball or roller therebetween. In such bearings the ball, and race adjacent the moving part, rotate during operation of the apparatus. The use of such bearings is by way of example only.

In the apparatus of FIGS. 1 and 2 the motor 74, 250 preferably comprises a stepper motor drive apparatus of the type described in U.S. Pat. No. 4,223,260 and made by GTE Valeron Corporation. In a like manner, a controller of the type described in U.S. Pat. No. 4,268,783 and also made by GTE Valeron Corporation can be used. However, the use of such a stepper motor and controller is by way of example only.

Figure 3:
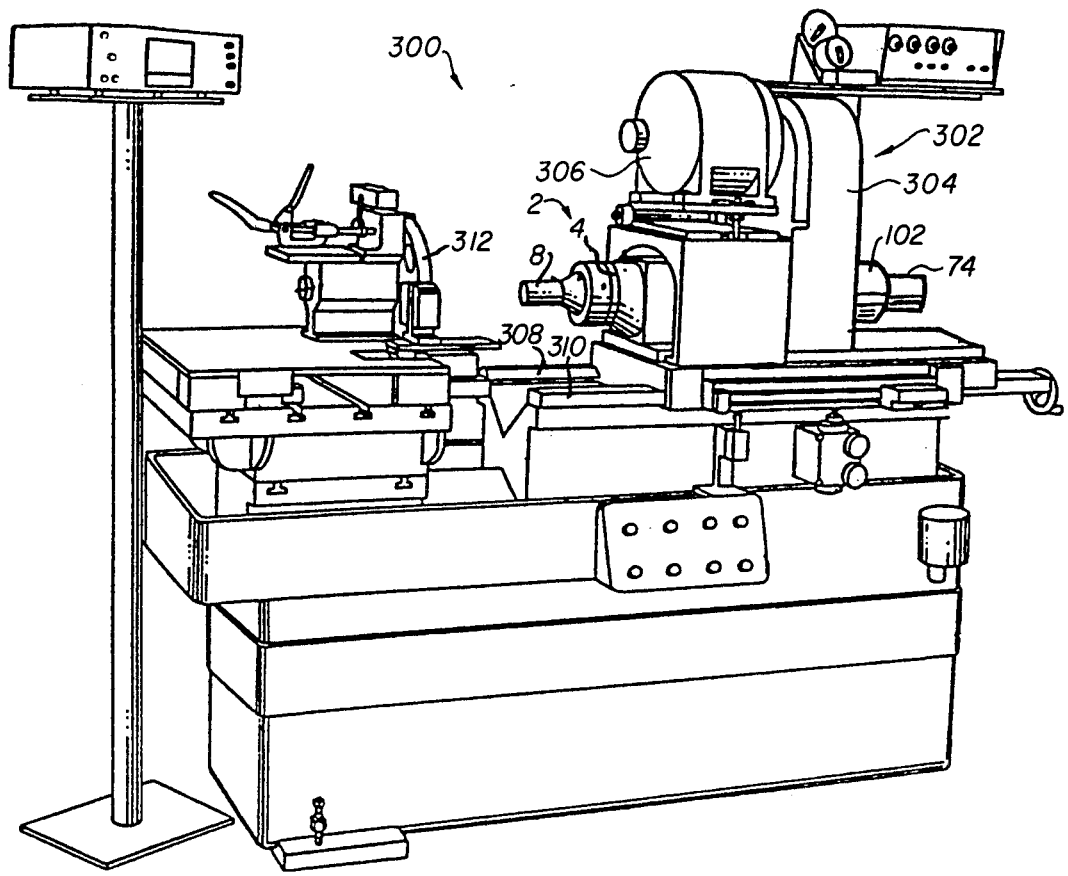
FIG. 3 is a view of one embodiment of a cutting machine incorporating the machine tool of the present invention.

An example of a cutting machine incorporating the machine tool of the present invention is depicted in FIG. 3. FIG. 3 depicts a cutting machine 300 generally of the type described in U.S. Pat. No. 3,740,161 but substituting a machine tool such as machine tool 2 which is of the type described herein and depicted in FIG. 1. The machine tool 2 includes a tool holder 8 having tool inserts 10 and 12 (not shown). The tool holder 8 is attached to the rotatably mounted housing 4 which is shown as extending from one end of the cutting apparatus 302. The motor 74 extends from the other end of the cutting apparatus 302. The pulley 40 and belt 48 are housed in a housing 304, the pulley being driven by a motor 306 in a known manner. The cutting machine 300 is described in detail in U.S. Pat. No. 3,740,161 and reference is made thereto for a description of the general operation of such a machine. However, it is to be noted that the entire cutting apparatus 302 is caused to slide along rails 308 and 310 so that the tool holder 8 is positioned for engagement of the workpiece 312 by the tool inserts 10 and 12 as already described in detail herein.

Although in the examples described herein the roller screw includes at least one nut body operatively coupled to the leadscrew spindle by inner and outer threads of the nut body and leadscrew spindle, respectively, such structure is by way of example only. Roller screws are well known in the art, and any type of roller screw which translates rotary motion into reciprocating motion may be engineered for use with the present invention. Examples, without limitation, include roller screws of the type sold by Nutec Components, Inc. under the trademark ROLLSCREW and roller screws of the type sold by Gewindle Satelliten Antriebe AG.

The machine tool of the present invention can be used in a closed loop system if desired. For example, in the apparatus of FIG. 1, motor 74 represents a stepper motor coupled to an encoder 120. The motor and encoder are shown schematically as being coupled to a controller 122, as, for example, a controller of the type disclosed in U.S. Pat. No. 4,268,783. Such combined structure is useful in assuring predetermined precision radial movement of cutting inserts as described herein. The use of an encoder in cutting applications is known in the art and will not be discussed further. However, it is noted that a useful encoder is available through PMI Motors, a division of Kollmorgen Corporation.

The embodiments which have been described herein are but some of several which utilize this invention and are set forth here by way of illustration but not of limitation. It is apparent that many other embodiments which will be readily apparent to those skilled in the art may be made without departing materially from the spirit and scope of this invention.

We claim:

1. An integral machine tool of the type circumscribing a longitudinal axis of rotation and adapted for having coupled thereto a tool holder which rotates about said axis and includes at least one cutting tool which is adjustable radially of said axis, said machine tool comprising:

a non-rotatable spindle body having a cavity therein extending along said axis from a first end to a second end;

a rotatable spindle shaft extending through said cavity and having an opening therethrough extending along said axis from one end to the other, said one end adapted to be coupled to said tool holder;

means coupled to said rotatable spindle shaft for rotating said rotatable spindle shaft;

a roller screw mounted within said opening, said roller screw including a leadscrew spindle extending along said axis and at least one nut body operatively coupled thereto, said roller screw being so mounted that rotary motion of said leadscrew spindle about said axis causes movement of said at least one nut body along said axis;

means coupled to said leadscrew spindle for controllably rotating said leadscrew spindle, said means including a non-rotating housing coupled to said means coupled to said rotatable spindle shaft;

means including a drawbar which is reciprocatingly and rotatably mounted with said opening and extends along said axis, said drawbar means being adapted to be coupled to said tool holder for rotation therein when said tool holder is rotated and for causing radial movement of said cutting tool when said drawbar means is reciprocated; and, means positioned within said opening and coupled to said drawbar means and to said at least one nut body for reciprocating said drawbar means along said axis in response to movement of said at least one nut body along said axis, said reciprocating means being non-rotatable.

2. The machine tool of claim 1 wherein said reciprocating means includes a slide member extending along said axis and having a first open end and an axially spaced second open end and wherein one end of said drawbar extends into said first open end and includes means coupled thereto for preventing axial movement of said drawbar relative to said slide member but permitting said drawbar to rotate relative to said slide member.

3. The machine tool of claim 2 wherein a portion of said leadscrew spindle extends into said second open end of said slide member, and said at least one nut body is operatively coupled to said portion and attached to said slide member to prevent movement of said at least one nut body relative to said slide member.

4. The machine tool of claim 2 wherein said leadscrew spindle rotating means is a motor, and further including means for coupling a portion of said leadscrew spindle extending out of said second open end of said slide member to said motor.

5. The machine tool of claim 4 wherein said coupling means includes a drive shaft which extends within said spindle shaft, one end of said drive shaft being coupled to said motor and the other end of said drive shaft being coupled to said leadscrew spindle.

6. The machine tool of claim 5 further including a stationary sleeve positioned with said spindle shaft and keyed to said slide member, and wherein said drive shaft extends through said sleeve by means of an opening extending from one sleeve end to an opposing sleeve end.

7. The apparatus of claim 4 wherein said motor is a stepper motor.

8. The apparatus of claim 7 wherein said motor is coupled to a controller mechanism.

9. The machine tool of claim 1 including a tool holder which is coupled to said one end of said rotatable spindle shaft and which is coupled to said drawbar means, said tool holder having coupled thereto a cutting tool for cutting a workpiece during rotation of said rotatable spindle shaft about said axis, said cutting tool being caused to move in a radial direction relative to said axis such that a cutting edge of said cutting tool is caused to engage and disengage said workpiece as a result of a camming action between said cutting tool and said drawbar means as said drawbar means is caused to reciprocate along said axis.

10. The apparatus of claim 9 wherein said leadscrew spindle rotating means is a motor.

11. The apparatus of claim 10 wherein said motor is a stepper motor.

12. The apparatus of claim 8 wherein an encoder is coupled to said controller mechanism and said motor.

13. The apparatus of claim 11 wherein said motor is coupled to a controller mechanism.

14. The apparatus of claim 13 wherein an encoder is coupled to said controller mechanism and said motor.

15. An integral machine tool of the type circumscribing a longitudinal axis of rotation and adapted for having coupled thereto a tool holder which rotates about said axis and includes at least one cuting tool which is adjustable radially of said axis, said machine tool comprising:
 a non-rotatable spindle body having a cavity therein extending along said axis from a first end to a second end;
 a rotatable spindle shaft extending through said cavity and having a first and second end, said first end adapted to be coupled to said tool holder;
 means coupled to said second end of said rotatable spindle shaft for rotating said rotatable spindle shaft, said rotating means including a housing extending away from said second end and having an opening therethrough extending along said axis from one end of said housing to the other;
 a roller screw mounted within said opening, said roller screw including a leadscew spindle extending along said axis and at least one nut body operatively coupled thereto, said roller screw being so mounted that rotary motion of said leadscrew spindle about said axis causes movement of said at least one nut body along said axis;
 means coupled to said leadscrew spindle for controllably rotating said leadscrew spindle, said means including a non-rotating housing coupled to said means coupled to said rotatable spindle shaft;
 means including a drawbar which is reciprocatingly and rotatably mounted within said rotatable spindle shaft and extends along said axis, said drawbar means being adapted to be coupled to said tool holder for rotation therewith when said tool holder is rotated and for causing radial movement of said cutting tool when said drawbar means is reciprocated; and,
 means positioned within said opening and coupled to said drawbar means and to said at least one nut body for reciprocating said drawbar means along said axis in reponse to movement of said at least one nut body along said axis.

* * * * *